(No Model.) 2 Sheets—Sheet 1.
D. H. TALBOT.
FLOOR FOR RAILWAY CARS.
No. 414,927. Patented Nov. 12, 1889.
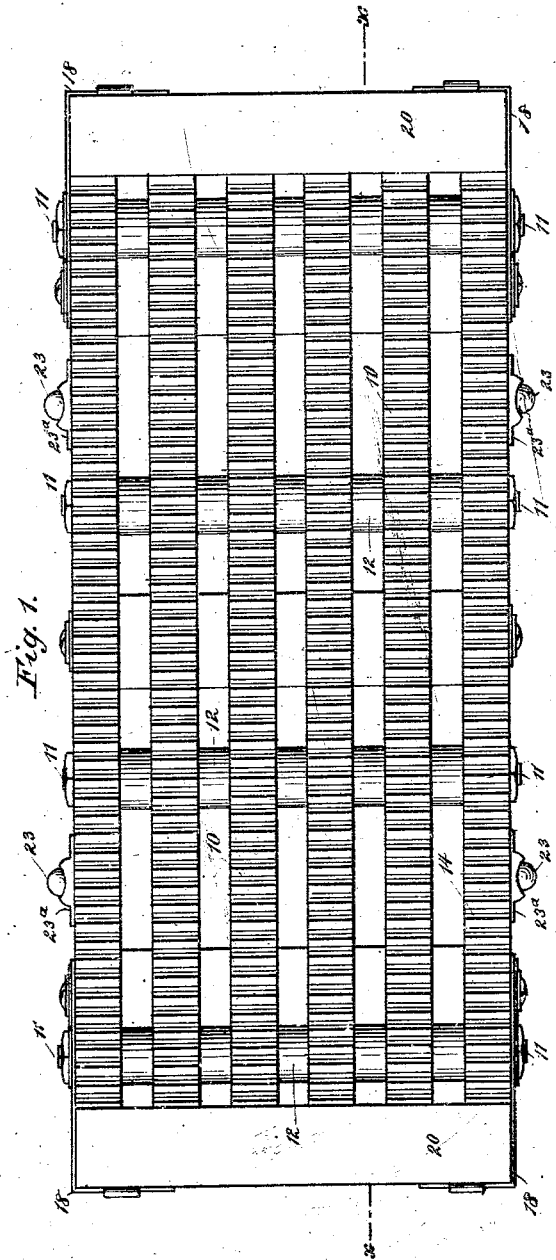
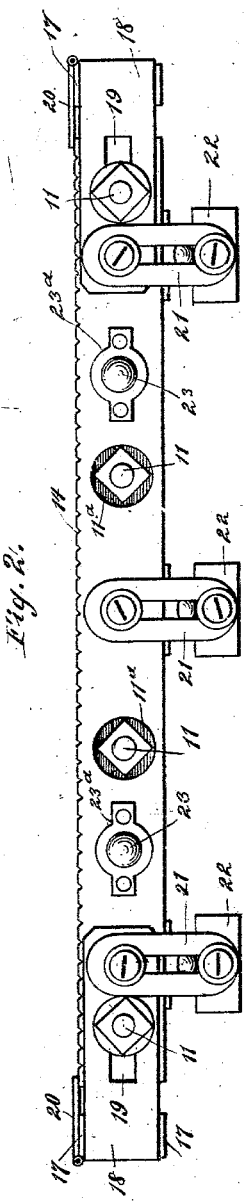
WITNESSES:
W. M. Twitchell.
E. M. Clark.
INVENTOR:
D. H. Talbot
BY Munn & Co.
ATTORNEYS.

(No Model.) 2 Sheets—Sheet 2.
D. H. TALBOT.
FLOOR FOR RAILWAY CARS.
No. 414,927. Patented Nov. 12, 1889.
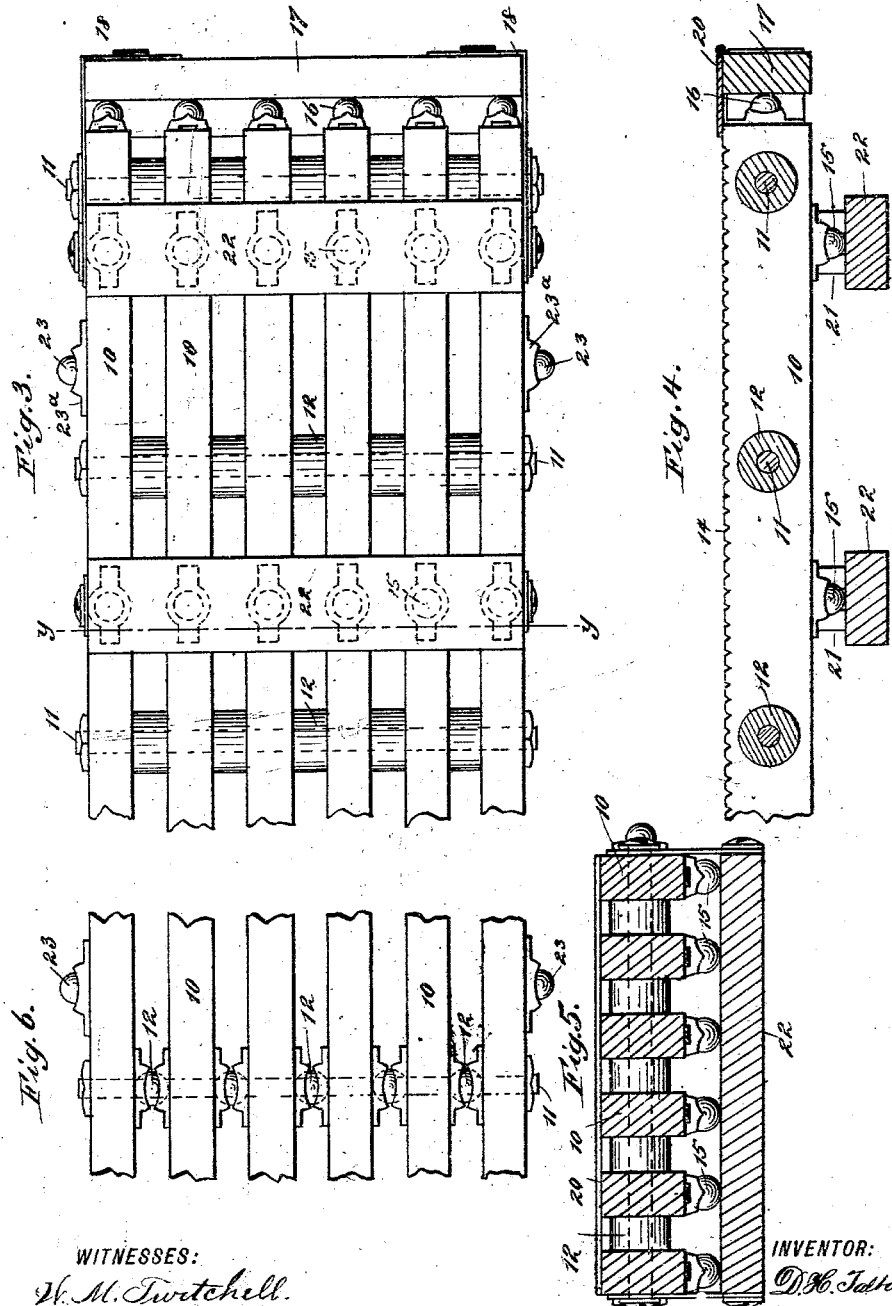
WITNESSES:
N. M. Twitchell.
E. M. Clark.
INVENTOR:
D. H. Talbot
BY Munn & Co.
ATTORNEYS.

UNITED STATES PATENT OFFICE.

DANIEL H. TALBOT, OF SIOUX CITY, IOWA.

FLOOR FOR RAILWAY-CARS.

SPECIFICATION forming part of Letters Patent No. 414,927, dated November 12, 1889.

Application filed June 26, 1889. Serial No. 315,638. (No model.)

*To all whom it may concern:*

Be it known that I, DANIEL H. TALBOT, of Sioux City, in the county of Woodbury and State of Iowa, have invented a new and Improved Auxiliary Floor for Railway-Cars, of which the following is a full, clear, and exact description.

My invention relates to an auxiliary floor for railway-cars, especially for freight and stock cars, and has for its object to provide an elastic floor capable of being expeditiously and conveniently applied to any freight-car, and which will promote the comfort of cattle, hogs, sheep, horses, or other stock that may be shipped, and wherein, when the cars are loaded with merchandise, the said merchandise will be less liable to injury.

The invention consists in the novel construction and combination of the several parts, as will be hereinafter fully described, and pointed out in the claims.

Reference is to be had to the accompanying drawings, forming a part of this specification, in which similar figures of reference indicate corresponding parts in all the views.

Figure 1 is a plan view of the floor. Fig. 2 is a side elevation of the same. Fig. 3 is a bottom plan view. Fig. 4 is a partial longitudinal section on line $x\,x$ of Fig. 1. Fig. 5 is a transverse section on line $y\,y$ of Fig. 3, and Fig. 6 is a partial plan view showing a modified form of spacing-springs.

The body of the floor is made up of a series of parallel strips 10, united and held in position by a series of bolts 11, passed transversely through them, which bolts are provided with suitable nuts at their extremities, and the outer face of the outer strips is recessed or countersunk, as at 11ª, Fig. 2, to receive the nuts, whereby the sides of the floor and the outer faces of the nuts are essentially flush. The strips 10 are held a suitable distance apart by means of springs 12, secured upon the bolts between each of the several strips, as illustrated in Figs. 1 and 3, in which figures the springs consist of heavy rubber tubing rigidly fastened to the bolts; but instead of tubing being employed for this purpose any other form of spring may be used, and if the spring is constructed of rubber it may, if desired, be shaped to the contour of a sphere having a bore to receive the bolts 11, as illustrated in Fig. 6. The strips 10 are held sufficiently close together to prevent the hoofs or the feet of the animals carried from passing down between them, and the upper face of the strips is provided, preferably, with a series of serrations 14, or otherwise roughened to prevent the stock from slipping.

The floor is preferably made in sections, one of which is illustrated, of sufficient length to extend transversely of the car.

Upon the under surface of each of the strips 10 a series of springs 15 is secured a suitable distance apart, and the said springs are so attached to the bottom of the floor that they will be arranged in transverse rows. The springs 15 may be of any desired character, being preferably, however, constructed of rubber and in the manner described in connection with the springs 12. A spring 16 is secured also to each extremity of each strip comprising the body of the floor. Each floor-section is provided at each end with a beam or cross-bar 17, the inner face of which is made to bear against the springs 16. This beam or cross-bar is preferably attached to the body of the floor by means of angle strips or irons 18, and one member of an iron is rigidly secured to the outer face of each cross-bar at each end, the other member being attached to the outer face of the outer strip 10 of the body.

The connection of the angle-irons to the outer body-strips is adjustable, and is effected by producing a slot 19 in the members, as illustrated in Fig. 2, and passing through the said slot a set-screw or the end of the bolt 11 nearest the extremity of the body, in which latter case the nuts screwed upon this bolt are made as thin as possible, so as to project but slightly from the sides of the body. It will be observed that by reason of this construction the floor may be varied in length somewhat, and thereby adjusted to cars of varying widths, if so desired.

In order that the animals standing upon the floor may not insert their feet between the extremities of the body-strips and the opposed face of the cross-bars 17, a wood or iron platform 20 is hinged or otherwise secured to the outer longitudinal edge of each cross-bar 17, which platform is adapted to extend over the end spring 16 and rest thereon or contact with the extremities of the strips 10.

Opposite each row of bottom springs 15 a link or slotted plate 21 is secured to each of the outer side strips 10, and to the lower end of the said link a beam or bar 22 is attached, as illustrated in Figs. 2 and 5. The upper face of this bar or beam is adapted to contact with the springs 15, and when these bars or beams 22 are employed and the floor is inserted in the car they rest upon the fixed floor of the said car, and thereby slightly elevate the auxiliary floor; but these bars or beams 22 may be dispensed with and the springs 15 of the auxiliary floor be brought in immediate contact with the main floor of the car, if so desired.

To the side face of the outer side strips 10 a series of springs 23 are attached, preferably consisting of a block of rubber formed to a spherical or to a hemispherical shape, which rubber block is held in a metal socket 23$^a$, the said socket being rigidly attached to the strips, as best illustrated in Figs. 1, 2, and 3.

In practice I prefer to construct the floor-sections of such a width that each section will accommodate an animal—a horse or a cow, for instance; but I do not confine myself to any specified width of the floor-sections.

When the car is what is known as a "double-decked" car—that is, provided with a lower and an upper floor—I prefer to attach to the pendent bars or beams 22 a board or boards to form a solid floor beneath the spring floor. When so constructed, the solid floor attached to the spring floor is made to rest upon the upper floor of the car. By this means any foreign matter will be prevented from passing downward to the lower floor.

I desire it to be distinctly understood that while specific construction has been described I do not confine myself thereto, as other equivalent construction may be employed.

Having thus described my invention, I claim as new and desire to secure by Letters Patent—

1. An auxiliary floor for railway-cars, consisting of a series of spaced slats, springs interposed between the said slats, and springs attached to the bottom of the slats, substantially as shown and described.

2. An auxiliary floor for cars, comprising a series of spaced and connected slats, springs intervening each of the slats, and springs attached to the bottom of the slats and at the ends thereof, substantially as shown and described.

3. The combination, with an auxiliary floor for cars, comprising a series of spaced connected slats provided with springs intervening the several slats, and springs secured to the bottom and ends thereof, of a cross-bar attached to the outer slats extending transversely across the ends of the same in contact with the end springs, and a platform held upon each of the cross-bars covering the space intervening the said cross-bars and the slats, substantially as shown and described.

4. The combination, with an auxiliary floor for cars, comprising a series of spaced and connected slats, springs intervening the several slats, and springs secured to the bottom and extremities of the slats, of cross-bars attached to the outer slats, a cross-bar extending across each extremity of the said slats in contact with the end springs and adjustably held to the slats, a platform hinged to each cross-bar covering the space between the said cross-bar and the slats, and pendent beams or bars attached to the outer slats and contacting with the springs secured to the under face of the several slats, all combined for operation substantially as shown and described.

DANIEL H. TALBOT.

Witnesses:
R. N. RICKETTS,
H. M. DONOHO.